(12) United States Patent
Luna (10) Patent No.: US 9,632,532 B2
(45) Date of Patent: Apr. 25, 2017

(54) CONFIGURING WEARABLE DEVICES

(71) Applicant: LENOVO (Singapore) PTE, LTD., New Tech Park (SG)

(72) Inventor: Joaquin F. Luna, Raleigh, NC (US)

(73) Assignee: Lenovo (Singapore) PTE. LTD., New Tech Park (SG)

(*) Notice: Subject to any disclaimer, the term of this patent is extended or adjusted under 35 U.S.C. 154(b) by 134 days.

(21) Appl. No.: 14/339,269

(22) Filed: Jul. 23, 2014

(65) Prior Publication Data

US 2016/0026211 A1    Jan. 28, 2016

(51) Int. Cl.
| G06F 3/00 | (2006.01) |
| G06F 13/12 | (2006.01) |
| G06F 13/38 | (2006.01) |
| G06F 13/00 | (2006.01) |
| G06F 13/24 | (2006.01) |
| G06F 1/16 | (2006.01) |
| G06F 3/06 | (2006.01) |

(52) U.S. Cl.
CPC ............ G06F 1/163 (2013.01); G06F 3/0634 (2013.01); *G06F 2212/6012* (2013.01)

(58) Field of Classification Search
CPC . A61B 5/0022; G08B 21/0211; G06F 3/0488; G06F 21/60
USPC .................. 710/14, 8, 74, 100, 261
See application file for complete search history.

(56) References Cited

U.S. PATENT DOCUMENTS

| 2006/0109083 A1* | 5/2006 | Rathus | G06F 17/30964 340/10.1 |
| 2010/0177599 A1* | 7/2010 | Pan | A61B 5/1113 368/11 |
| 2011/0066049 A1* | 3/2011 | Matsumoto | A61B 5/02438 600/500 |
| 2013/0181833 A1* | 7/2013 | Al-Ali | G08B 21/0211 340/539.12 |
| 2013/0293505 A1* | 11/2013 | Krishnamurthy | G06F 3/0488 345/173 |
| 2013/0300578 A1* | 11/2013 | Uchida | A61B 5/0022 340/870.02 |
| 2014/0366123 A1* | 12/2014 | DiBona | G06Q 10/00 726/16 |

* cited by examiner

*Primary Examiner* — Ernest Unelus
*Assistant Examiner* — Getente A Yimer
(74) *Attorney, Agent, or Firm* — Kunzler Law Group (57) ABSTRACT

For configuring wearable device, a method is disclosed that includes detecting a current wearable state for a wearable device, wherein the current wearable state is selected from the group consisting of on a person and off a person, and modifying a setting for the wearable device based on the detected wearable state.

20 Claims, 8 Drawing Sheets

CONFIGURING WEARABLE DEVICES

BACKGROUND

Field

The subject matter disclosed herein relates to wearable computing devices and more particularly relates to configuring wearable devices.

Description of the Related Art

As technology continues to advance, computing devices will decrease in size. As computing devices decrease in size, they may find their way into other items that are wearable by a user. In certain examples, computing devices may be included in watches, necklaces, bracelets, or similar.

A computing device included in a wearable item may not be aware if the wearable item is currently being worn. Therefore, in certain examples, the wearable computing device may continue to operate although it is not being worn by the user. If a user desires to power down the wearable device, the user must manually power down the wearable device. In other examples, it may be less secure when a wearable devices continues to operate although it may no longer be on a user's person.

BRIEF SUMMARY

An apparatus for configuring wearable devices is disclosed. In one embodiment, the apparatus includes a processor and a memory that stores code executable by the processor. In one embodiment, the code may detect a current wearable state for a wearable device, wherein the current wearable state is selected from the group consisting of on a person and off a person. In a further embodiment, the code may modify a setting for the wearable device based on the detected wearable state. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
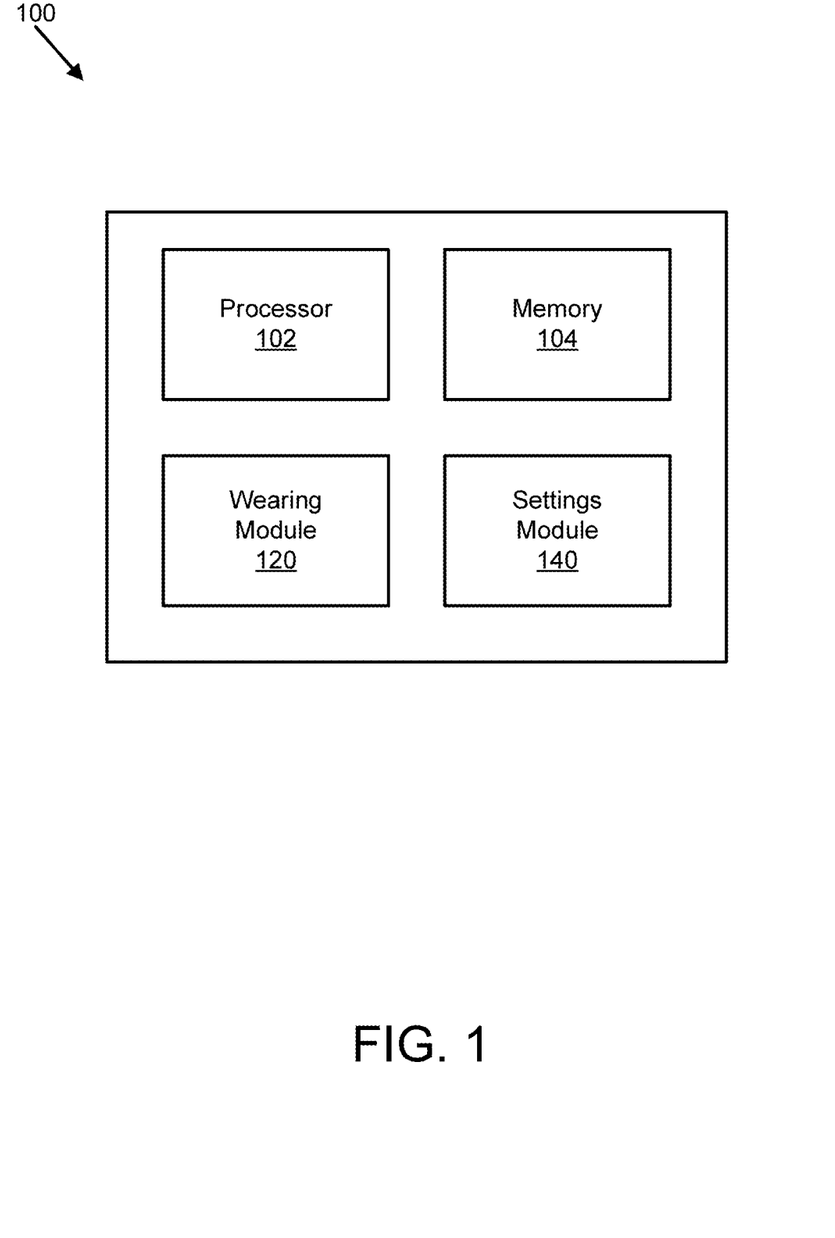
FIG. 1 is a schematic block diagram illustrating one embodiment of an apparatus for configuring wearable devices.

FIG. 1 is a schematic block diagram illustrating one embodiment of an apparatus for configuring wearable devices. In one embodiment, the apparatus 100 includes a processor 102 and a memory 104 that stores code executable by the processor 102. The processor 102 may be any processor capable of executing executable code as one skilled in the art may appreciate. The memory 104 may be any memory storage device that is capable of storing executable code. The memory 104 may be volatile, non-volatile, solid state, magnetic, optical, or other, or the like as one skilled in the art may appreciate.

In one embodiment, the code may include code that defines one or more wearable states for a wearable device. The code may receive input from a user that defines one or more wearable states. The code may automatically determine wearable states based on the wearable device. For example, the code may determine one wearable state to be on a person and another wearable state to be off a person.

In one embodiment, the wearable state on a person may include the wearable device being connected with the person in some way. In another embodiment, the wearable state on a person, may include the wearable device interacting with the person in some way. In one example, the wearable device may be a watch, and on a person may include the watch being on a user's wrist or other part of the person. In another example, the wearable device may include a necklace and on a person may include the necklace being around a person's neck. In another example, the wearable device may be headphones and on a person may include the headphones being attached to a head of a person. In another example, the wearable device may include glasses and on a person may include the glasses hanging in front of eyes for a person. Of course, one skilled in the art may appreciate other wearable device and other ways in which a wearable device may be on a person, and this disclosure is meant to include all such ways. In other examples, a wearable device may be on a person if the wearable device is in a pocket, in a backpack, purse, other carrier, or the like while the person is moving.

In another embodiment, on a person may include the wearable device affecting another device that may be on the person. In one example, the wearable device may include an audio player and on a person may include the audio player transmitting an audio signal to speakers at or on the person. Because the audio player may cause the speakers to emit the audio signal, the audio player may be on a person.

In another embodiment, a wearable device may be on a person if the wearable device is currently performing an intended function. For example, an audio player may be on a person if the audio player is playing audio for the person. In another example, a cellular device may be on a person if the person is currently in communication with a remote person via the cellular device. One skilled in the art may appreciate other ways in which a wearable device may be performing an intended function and the wearable state on a person may include all such ways.

In one embodiment, the wearable state off a person may include the wearable device not being connected with the person in some way. In another embodiment, the wearable state off a person may include the wearable device not interacting with the person in any way. In one example, the wearable device may be a watch, and off a person may include the watch not being on a user's wrist or other part of the person. In another example, the wearable device may include a necklace and off a person may include the necklace not being around a person's neck. In another example, the wearable device may be headphones and off a person may include the headphones not being about a head of a person. In another example, the wearable device may include glasses and off a person may include the glasses not hanging in front of eyes for a person. Of course, one skilled in the art may appreciate other wearable device states and other ways in which a wearable device may be off a person, and this disclosure is meant to include all such ways.

In another embodiment, a wearable device may be off a person if the wearable device is not currently performing an intended function. For example, an audio player may be off a person if the audio player is not powered on. In another example, a cellular device may be off a person if the cellular device is sleeping, hibernating, or the like. Therefore, in certain embodiments, although an audio generator may be in a user's pocket, the audio generator may be in the wearable state off a person if the audio generator is not currently generating audio.

Therefore, in certain embodiments, a wearable state may be configured by a user. For example, where a wearable device may include an audio player, a user may define the audio player being in a user's pocket and powered off as on a person, while a different user may define the audio player being in a user's pocket and powered off as off a person.

As described herein, a wearable device may include any device that may be physically retained, held, carried, transported, moved, or the like, by a user. A wearable device, in certain embodiments, may include a device that may be worn by a user, as one skilled in the art may appreciate. In other embodiments, a wearable device may include a device that may fit within a pocket of the user, hangs from a part of the user, rests on a user, or is contained in any compartment included within an article of clothing being worn by the user. Of course, one skilled in the art may appreciate certain other ways in which a device may be worn by a user and this disclosure is meant to include all such ways. In certain embodiments, the wearable device may be selected from group consisting of a hearing aid, a medical sensor, a watch, a ring, an audio player, a cellular phone, glasses, headphones, a necklace, anklet, or other, or the like.

In one example, the wearable device may include a watch. A watch may include an on a person wearable state and an off a person wearable state. A watch being on the user may include the watch being strapped around a wrist, arm, or other part of the user. In another example, the on wearable state may include a clasp for the watch being closed. An off wearable state may include a clasp for the watch being disconnected.

In another example, the wearable device may include a necklace, or other item that may fasten around a neck of the wearer. In one example, an on wearable state may include the necklace being worn by a user. An off wearable state may include the necklace not being worn by a user. In other examples, an on wearable state may include the necklace being closed such that it is connected all the way around. In one example, an off wearable state may include the necklace being open such that it does not form a complete loop.

In one example, the wearable device may include a hearing aid, or other medical device. In one example, an on a person wearable state may include the hearing aid being installed in a user's ear canal. In another example, an off a person wearable state may include the hearing aid being out of a user's ear canal. Of course, one skilled in the art may appreciate other potential wearable states and this disclosure is meant to include all such states.

In another example, the wearable device may include headphones. In one example, an on a person state may include the headphone being in contact with a head, ears, or other part of a user. In another example, an off a person state may include the headphones not being in contact with a potential wearer.

In another example, the headphones may be connected to an audio generation device that may be on the user's person. Therefore, in one example, a on a person wearable state may include the wearable device being connected to a person in some fashion. For example, the on a person wearable state may include the wearable device being physically connected to another device that may be in a pocket of the user. In another example, the on a person wearable state may include a connected wearable state that may include the wearable device being sufficiently close to the user to communicate wirelessly with another device that may be on the user's person.

In one example, the user may include a device that communicates wirelessly at a 20 foot radius. In response to a wearable device moving within range of a user such that it may communicate with the device in the user's pocket, the wearable device may be connected to the user. Therefore, the wearable device may be on a person if it is within a threshold communication range. Of course, other ranges may be used and this disclosure is not limited in this regard. Therefore, in various embodiments, a connected wearable state may include a wearable device communicating with another device on the user's person.

In other embodiment, various wearable devices may include many different wearable states and respective wearable devices may include different wearable states. Therefore, this disclosure is not limited regarding the amount, type, or count of different wearable devices.

In another embodiment, the apparatus may include a wearing module 120. The wearing module 120 may include code that detects a current wearable state for a wearable device, wherein the current wearable state is selected from the group consisting of on a person and off a person. In another embodiment, the wearing module 120 may detect a change in a current wearable state for the wearable device. In one example, a user may remove a watch from his/her person. In response to the user removing the watch, the wearing module 120 may detect the watch changing from an on a person wearing state to an off a person wearing state.

In another example, a user may remove a hearing aid from an ear canal. The wearing module 120 may detect that the hearing aid had been removed, and may detect that a current wearable state for the hearing aid may have changed from an on a person state to an off a person state.

In another example, a user may be connected to a medical sensor, such as, but not limited to, a blood sugar level sensor, a blood pressure sensor, a heartbeat monitor, or other, or the like.

In another embodiment, the wearing module 120 may detect the current wearable state as on the person in response to detecting a human audio signal. In another embodiment, the wearing module 120 may identify a voice of a specific user. Although other human audio signals may be detected, the wearing module 120 may determine that the wearable device is being worn in response to recognizing the audio signal from the specific user.

In one embodiment, the wearing module 120 may detect the current wearable state as off the person in response to not detecting a human audio signal. In another embodiment, the wearing module 120 may detect the wearable state as off the person in response to not detecting an audio signal from an identified user. In certain embodiments, the wearing module 120 may communicate with a microphone, or the like, to receive the audio signal from one or more persons.

In another embodiment, the apparatus may include a settings module 140. In certain embodiments, the settings module 140 may modify one or more settings for the wearable device based on the current wearable state.

A setting for a wearable device may include, but is not limited to, any configuration parameter that may alter a behavior of the wearable device. In one example, the setting may include a power setting. A power setting may include being on, being off, or being in a low power state, another modified power state, a custom power state, hibernated, asleep, or other, or the like. In one example, a wearable device that is a digital watch may enter a lower power state in response to the user removing the watch from his/her wrist. Of course, one skilled in the art may appreciate other ways in which a power state for a wearable device may be modified and this disclosure is meant to include all such ways.

In another embodiment, the setting may include a security setting. A security setting may include logging in, logging out, locking the device, showing a screen saver, locking a screen, disabling communications, modifying a security policy, or other, or the like. In one example, the wearable device may include digital glasses. In response to the glasses being removed from the person, the glasses may lock. In response to locking, a user may be required to enter a password or other security credential to continue using the glasses. In another example, the glasses may clear a screen for the glasses in response to the glasses being removed.

In another example, in response to the wearing module 120 determining that the wearable device is being worn, the settings module 140 may adjust a setting to require the user to authenticate with the wearable device. In another example, the settings module 140 may adjust a timeout value for locking the wearable device. In another embodiment, the settings module 140 may log a user off of the wearable device. For example, the settings module 140 may reduce the timeout value for locking the wearable device in response to the wearable device not being worn and may increase the timeout value for locking the wearable device in response to the wearable device being worn. Of course, one skilled in the art may appreciate other security settings and this disclosure is not limited in this regard.

In another embodiment, the setting may include a communication setting. A communication setting may include enabling/disabling communication interfaces, adjusting performance of a communications interface, modifying a protocol for a communications interface, or the like. In one example, a cellular communication device may be configured to not notify a user of received text messages based on the cellular device being in the wearable state off a person. One skilled in the art may appreciate other settings that may modify a communication property for the wearable device and this disclosure is means to include all such settings.

In one example, the wearable device may include a Bluetooth communications capability. In response to the wearing module 120 determining that the wearable device is in the on a person wearable state, the settings module 140 may power on Bluetooth communications and/or may pair the wearable device with other devices. In response to the wearing module 120 determining that a current wearable state for the wearable device includes the wearable state off a person, the settings module 140 may power down the Bluetooth communications and/or may reduce a polling rate for communications. The settings module 140 may reduce power consumption for the wearable device by modifying one or more settings for the wearable device.

In another embodiment, the setting may include a performance setting. A performance setting may include processor clock settings, memory settings, enable/disable a hardware component, or other setting that may affect the performance of the wearable device. In one example, the settings module 140 may reduce a clock speed for a processor in response to the wearable device being in an off a person wearable state. Of course, one skilled in the art may appreciate other settings that may affect performance of the wearable device and this disclosure is meant to include all such settings.

In one example, the wearing settings module 140 may modify a setting selected from the group consisting of powering on, enabling inputs, enabling alerts, enabling wireless communications, and enabling an output in response to the wearing module detecting the current wearable state is on the person.

In another embodiment, the setting may include an input setting. An input setting may include a wireless transmission, a camera, a sensor, a switch, or other, or the like. In one example, a wearable device may include a camera and the settings module 140 may disable the camera in response to the wearing module 120 determining that the wearable device is no longer being worn. Of course, one skilled in the art may appreciate other ways in which performance of an input may be modified by one or more settings and this disclosure is meant to include all such ways.

In another embodiment, the setting may include an output setting. An output setting may include, but is not limited to, a wireless transmission, a display screen, audio transmissions, notifications, or other, or the like. In one example, the setting may disable a display screen for the wearable device in response to the wearing module 120 determining that the wearable device is no longer being worn. Of course, one skilled in the art may appreciate other ways in which performance of an input may be modified by one or more settings and this disclosure is meant to include all such ways.

In one example, the wearing module 120 may determine that the wearable device is in an on a person wearable state and the settings module 140 may set a setting that may cause the wearable device to display text messages on a display screen for the wearable device. The wearing module 120 may determine that the wearable device is not being worn, and the settings module 140 may set a setting that may cause the wearable device to disable notification and/or disable haptic feedback. Disabling notifications and/or haptics feedback may reduce power consumption for the wearable device and may increase privacy by not outputting information while the user is not wearing the wearable device.

In another example, the settings module 140 may modify a setting selected from the group consisting of powering off, disabling inputs, requiring an authentication for subsequent inputs, communicating a recharge reminder, disabling wireless communications, disabling alerts, and disabling an output in response to the wearing module 120 detecting the current wearable state is off the person.

In another example, in response to the wearing module 120 determining that the device is no longer being worn, the settings module 140 may modify a setting to remind a user to recharge the wearable device.

In another example, the wearable device may include headphones. In response to the wearing module 120 determining that the headphones are no longer being worn, the settings module 140 may pause music being played. In response to the wearing module 120 determining that the headphones are again being worn, the settings module 140 may again play the music that may have been previously paused.

Figure 2:
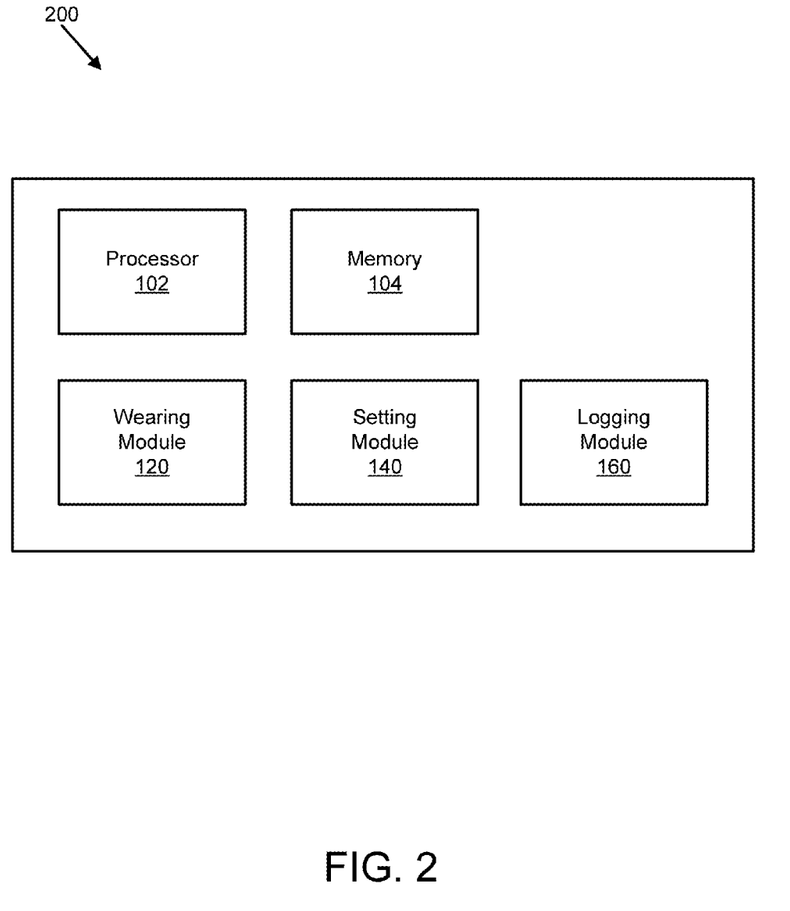
FIG. 2 is a diagram illustrating another embodiment of an apparatus for configuring wearable devices.

FIG. 2 is a diagram illustrating another embodiment of an apparatus for configuring wearable devices. In one embodiment, the apparatus includes the processor 102, the memory 104, the wearing module 120, the setting module 140, and a logging module 160. The processor 102, the memory 104, the wearing module 120, and the setting module 140 may or may not be substantially similar to those depicted in FIG. 1.

In one embodiment, the wearing module 120 may identify a user of the wearable device. The setting module 140 may modify one or more settings based on the identification of the user.

In another embodiment, the wearing module 120 may identify the user and may determine that the wearable device is being worn by the user. In one example, the wearing module 120 may use a heartbeat sensor to recognize the user. In other examples, the wearing module 140 may use a camera, facial recognition, an authentication token, a password, or other, or the like. Therefore, in certain embodiments, the wearing module 120 may determine that the wearable device is not being worn in response to a person other than the user wearing the wearable device.

In one embodiment, the wearing module 120 may detect the current wearable state as on a person in response to identifying an image of the person. In another embodiment, the wearing module 120 may detect the current wearable state as off the person in response to not identifying the image of the person. In one example, an image of the person may be captured by a camera, or other, or the like as one skilled in the art may appreciate.

In another embodiment, the apparatus 200 may include the logging module 160 that may log changes in a wearable state for the wearable device. In one example, the wearable device may include a fitness product. The wearing module 120 may upload the changes to a remote server. In one example, the wearable device may include a pedometer. The wearing module 120 may record when the pedometer is being worn and when it is not being worn. Furthermore, the logging module 160 may also include pedometer information in the upload to the server.

Figure 3:
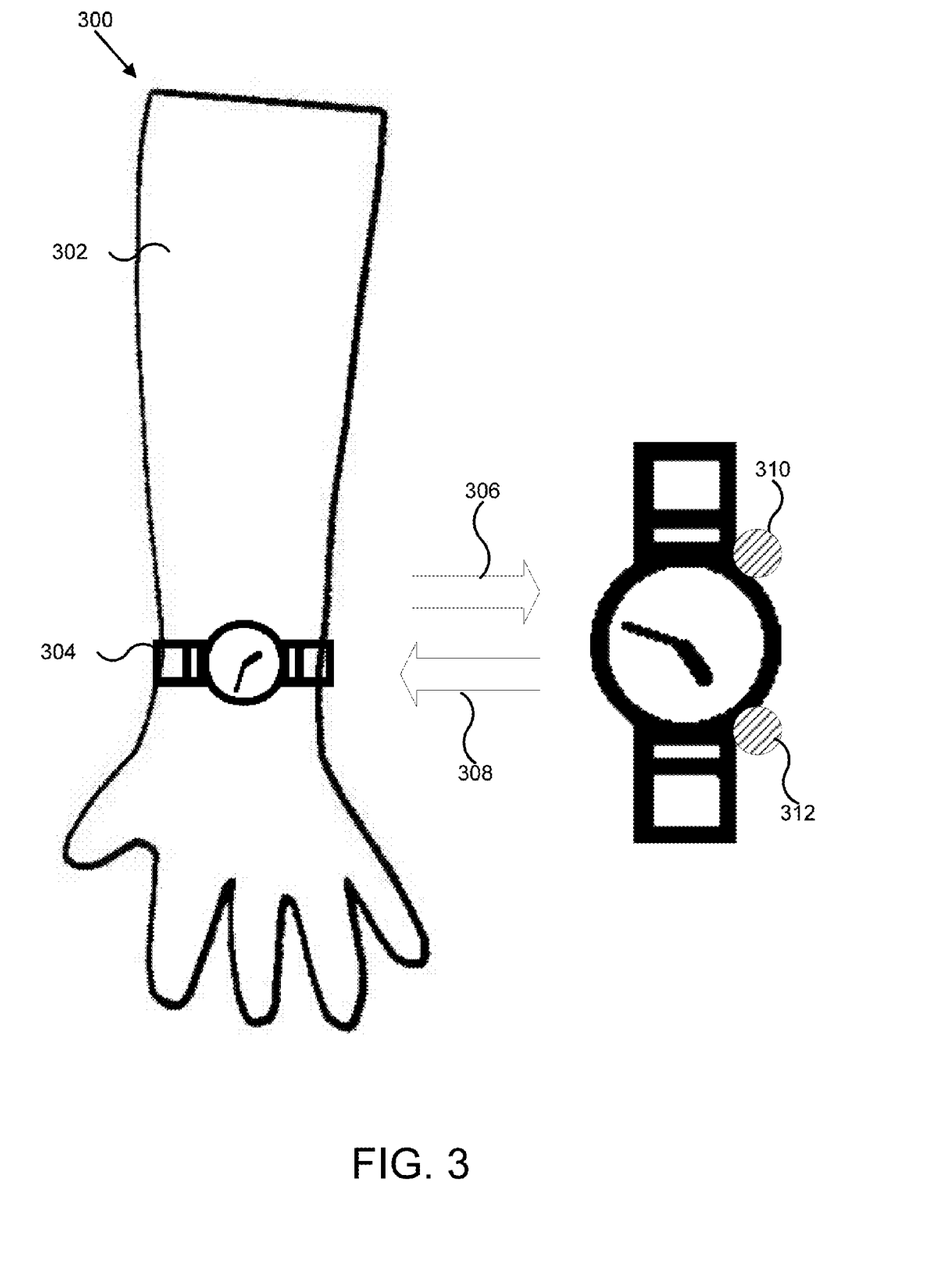
FIG. 3 is a diagram illustrating one example of configuring a wearable device.

FIG. 3 is a diagram illustrating one example of configuring a wearable device. In one embodiment, the wearable device may include a watch 304. The watch may be worn on an arm 302 of the user. The watch 304 may include two sensors 310,312 that may detect when a user's skin is nearby. In one example, the sensors 310,312 may include electromagnetic sensors that may detect an electromagnetic field associated with a user's skin. In another example, the sensors 310,312 may determine a conductance of a user's skin. The wearing module 120 may determine that the watch 304 is being worn in response to the sensors 310,312 detecting a user's skin.

In another example, the sensors 310,312 may include sensor that may determine if a clasp for the watch 304 is opened or closed. The wearing module 120 may determine that the watch 304 is being worn in response to the clasp being closed. In another example, the sensors 310,312 may detect skin capacitance. In another example, the sensors 310,312 may include sensors to detect a temperature associated with a user's skin.

In one embodiment, the wearing module 120 may determine that a wearable device is in an on a person wearable state in response to motion being detected at the wearable device. In another example, the sensors 310,312 may include motion sensors. The wearing module 120 may determine that the watch is being worn in response to the sensors 310,312 detecting movement at the watch 304.

Detecting motion may include comparing detected motion with historical patterns of motion. For example, a wearable device in a person's pocket while the person is walking may experience a regular motion pattern. Of course, other patterns of motion may be detected by the wearing module 120. Motion may be measured relative to a user, or relative to the Earth. In another example, the wearing module 120 may include GPS capabilities as one skilled in the art may appreciate, and motion may include the wearing module 120 determining that the wearable device is in motion based on positioning data received from one or more GPS satellites, or other, or the like.

In one example, consistent motion in one direction may not indicate that the wearable device is being worn, but may indicate that the wearable device is being transported. In another example, motion that includes periodic random movements may indicate that the wearable device is being worn. Periodic random movements may include movement in different directions every few seconds, or similar. A motion pattern that may be consistent with common human motion may also be detected by the wearing module 120.

In one example, the wearable device may include a watch 304, and a periodic swinging pattern consistent with a wrist of a use swinging when walking may also indicate that the wearable device is being worn. Of course, one skilled in the art may recognize other motion patterns consistent with a wearable device being worn by a user and this disclosure is meant to include all such patterns. In one embodiment, the wearing module may detect a current wearable state as on the person in response to detecting human motion and may detect the current wearable state as off the person in response not detecting human motion.

In response to the wearing module 120 determining that the watch 304 transitioned 308 from being worn to not being worn, the setting module 140 may modify one or more settings for the watch as previously described. In response to the wearing module 120 determining that a current wearable state for the watch 304 changed 306 from not being worn to being worn, the setting module 140 may modify one or more settings for the watch as previously described.

Figure 4:
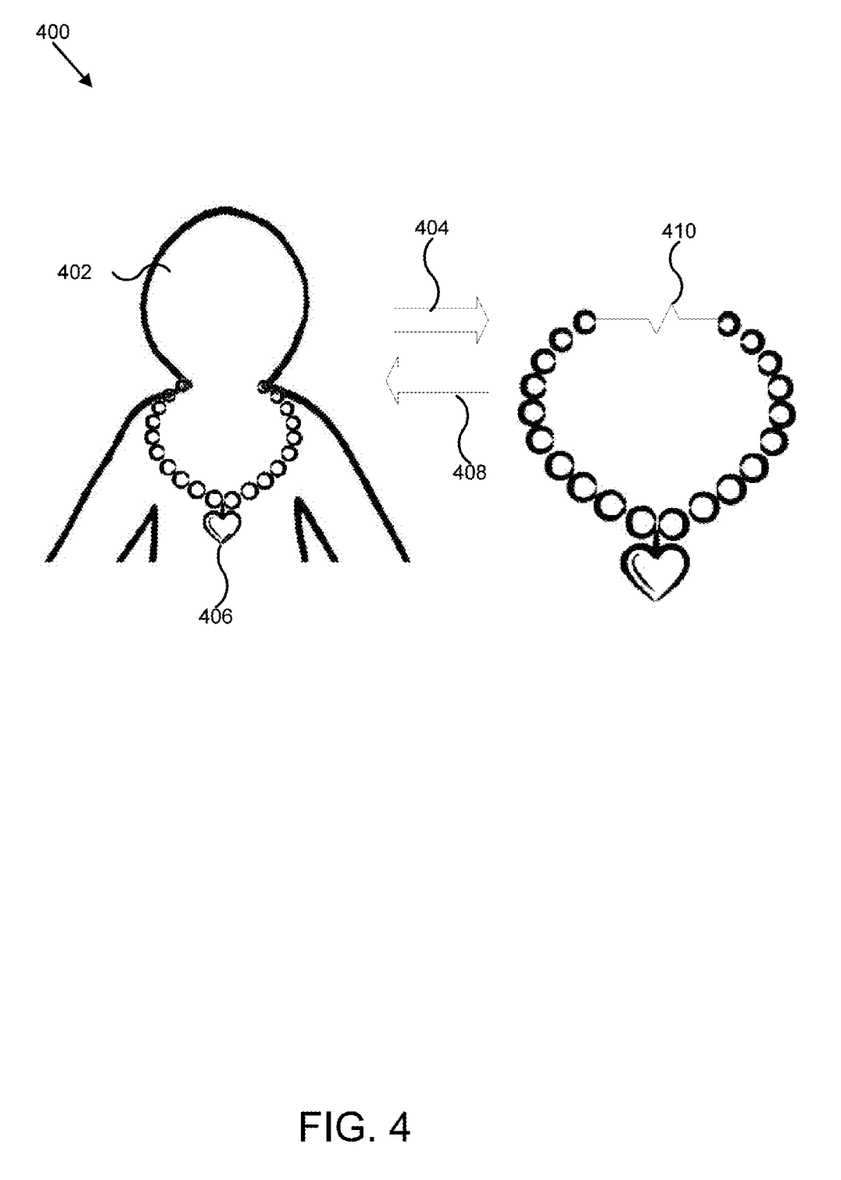
FIG. 4 is a diagram illustrating one example of configuring a wearable device.

FIG. 4 is a diagram illustrating one example 400 of configuring a wearable device. In one example, the wearable device may include a necklace 406. A user 402 may wear the necklace 406 about his/her neck, but of course, this is not necessarily the case. The necklace 406 may include one or more electrical components, such as, but not limited to, a speaker, a battery, a light emitter, or other, or the like.

In one example, the necklace 406 may include a sensor 410 that may detect if the necklace forms a closed loop. A wearer of the necklace 406 may close the loop about his/her neck and the wearing module 120 may determine that the necklace 406 is being worn based on the sensor 410 detecting that two ends of the necklace 406 are in contact with each other.

In response to the necklace 406 changing 404 from a being worn state to a not being worn state, the wearing module 120 may determine that a change has occurred in the current wearable state of the necklace 406. In response, the setting module 140 may stop a light from blinking, may turn one or more electrical components off, may change a power state for the necklace, or other setting as described herein. In response to the wearing module 120 determining that a current wearable state for the necklace 406 changed 408 from not being worn, to being worn, the setting module 140, in one example, may enable a speaker for the necklace 406, may enable a light for the necklace 406, or may enable any other functionality, electrical component, or other, or the like.

In another example, the necklace 406 may include a heartbeat monitor. The wearing module 120 may determine that the necklace is being worn in response to the heartbeat monitor detecting a heartbeat for the user. Accordingly, the setting module 140 may modify one or more settings for the necklace.

Figure 5:
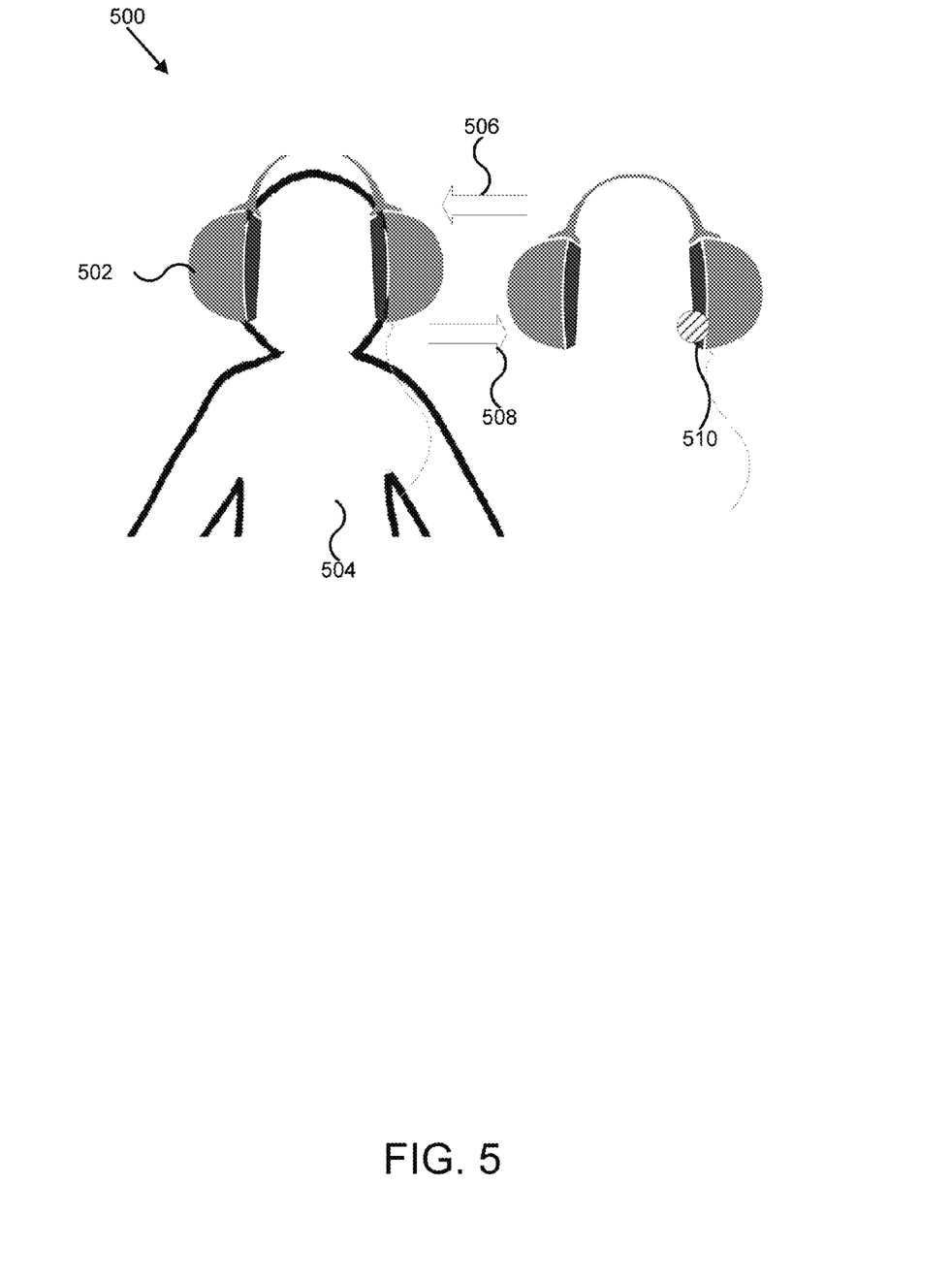
FIG. 5 is a diagram illustrating one example of configuring a wearable device.

FIG. 5 is a diagram illustrating one example 500 of configuring a wearable device. In one example, the wearable device may include headphones 502 that may be worn by a user 504. The headphones may include a sensor 510 that may detect a user or a user's skin. In one example, the sensor 510 may include an infrared sensor that may detect if a user is wearing the headphones. In another example, the sensor 510 may include a temperature sensor that may determine if a user's skin is in contact with the sensor. In certain examples, the temperature sensor may be a thermometer, a camera, or other, or the like as one skilled in the art may appreciate. In another example, the sensor 510 may include another electrical sensor that may sense capacitance or resistance of a user's skin that may be in contact with the sensor 510.

In another embodiment, the wearing module 120 may receive a worn temperature threshold value. The wearing module 120 may detect the current state as on a person in response to a temperature exceeding the worn temperature threshold value. In another embodiment, the wearing module 120 may detect the current state as off a person in response to the temperature falling below the temperature threshold value, or a not worn threshold value.

In response to the wearing module 120 determining that the headphones 502 are being worn by a user 504, the setting module 140 may pause music being played at the headphones 502. In another example, the setting module 140 may raise or lower a volume for the music or sound being played at the headphones 502. Of course, one skilled in the art may recognize other settings that may be made to the headphones and this disclosure is meant to include all such settings.

Figure 6:
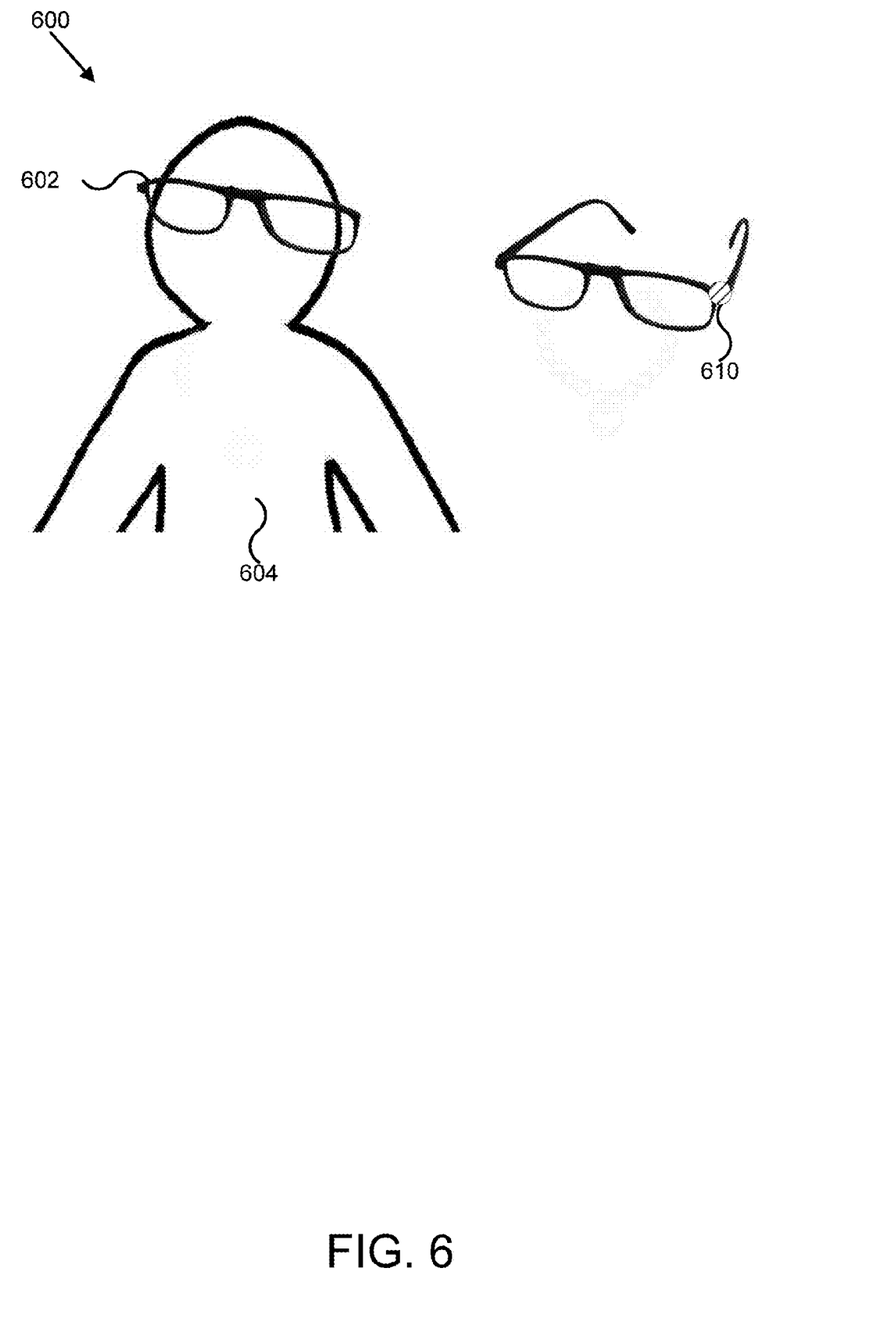
FIG. 6 is a diagram illustrating one example of configuring a wearable device.

FIG. 6 is a diagram illustrating one example 600 of configuring a wearable device. In this example, the wearable device may be a pair of glasses 602. The glasses 602 may include a mechanical sensor 610 that may determine if the glasses are opened or closed. The wearing module 120 may determine if the glasses are being worn or not based, at least in part, on feedback from the sensor 610. For example, in response to the sensor 610 determining that the glasses are opened, the wearing module 120 may determine that the glasses are being worn. In response to the sensor 610 determining that the glasses are closed, the wearing module 120 may determine that the glasses are not being worn.

In response to the wearing module 120 determining that the glasses are not being worn, the setting module 140 may modify one or more settings for the glasses. In one example, the setting module 140 may disable or enable electrical components of the glasses. Of course, one skilled in the art may recognize many other settings that a setting module may modify, and this disclosure is not limited in this regard.

Figure 7:
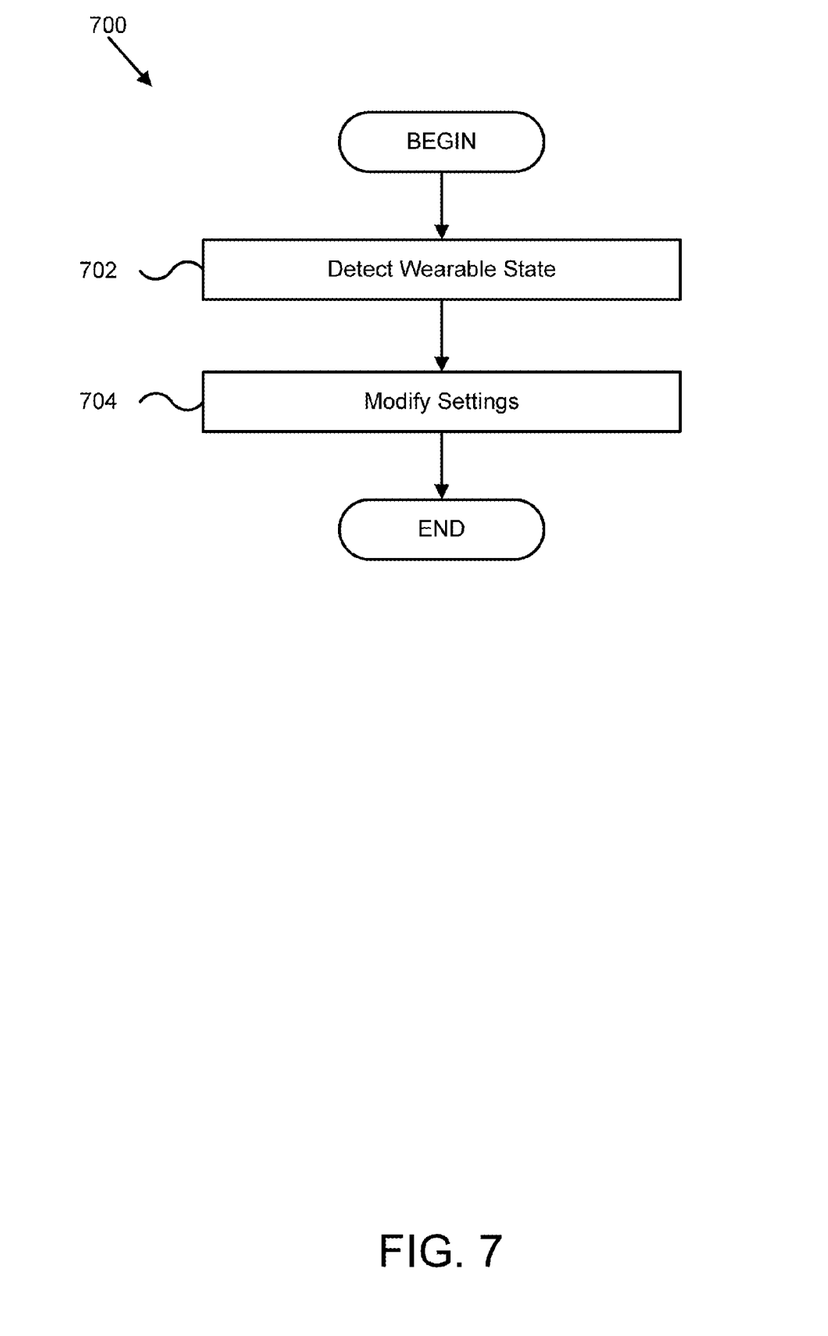
FIG. 7 is a schematic flow chart diagram illustrating one embodiment of a method for configuring wearable devices.

FIG. 7 is a schematic flow chart diagram illustrating one embodiment of a method 700 for configuring wearable devices. In one embodiment, the method 700 may begin and a wearing module 120 may detect 702 a current wearable state for a wearable device. In another embodiment, the current wearable state may be selected from the group consisting of on a person and off a person. In a further embodiment, the wearing module 120 may detect a change in a current wearable state for the wearable device. The setting module 140 may modify 704 one or more configuration parameters for the wearable device responsive to the change and the method may end.

In another embodiment, the wearing module 120 may automatically determine the wearable states without user intervention. The wearable states may or may not correlate with a type of the wearable device. For example, if the wearable device is a bracelet, the wearing module 120 may define wearable states for the bracelet to be on, or off. Of course, one skilled in the art may recognize other potential wearable states and this disclosure is not limited in this regard. In one example, the wearable state may be selected from the group consisting of on a person, off a person, or other, or the like. In other embodiment, on a person may include connected to a person, off a person may include not being connected to a person, or similar.

In one embodiment, the detecting a current wearable state for the wearable device may include communicating with one or more sensors at the wearable device. In one example, the wearing module 120 may detect a change in the wearable state for the wearable device in response to a change in a mechanical switch. In another example, the wearing module 120 may detect a change in the wearable state responsive to a change in feedback from one or more biometric sensors. For example, a biometric sensor may include a fingerprint scanner and the wearing module 120 may determine that a wearable device is being worn in response to the fingerprint scanner detecting a fingerprint for a user. In another example, a biometric sensor may include a heartbeat monitor and the wearing module 120 may determine that a wearable device is being worn in response to the heartbeat monitor detecting a heartbeat.

In another example, the wearing module 120 may detect a change in the wearable state for the wearable device responsive to one or more sensors identifying a specific user. For example, a camera for the wearable device may include facial recognition capabilities, and the wearing module 120 may detect a change in the wearable state based on the camera sensing or no longer sensing a specific user associated with the wearable device. Therefore, in certain embodiments, the wearing module 120 may detect a change in a wearable state based on an identification of the user.

In one embodiment, modifying one or more configuration parameters may include adjusting, changing, altering, modifying, replacing, or the like, a setting for the wearable device. The setting may include a power setting, a security setting, a communication setting, a performance setting, an input setting, an output setting, or other setting. Of course, one skilled in the art may recognize other settings that a setting module 140 may modify responsive to a change in the wearable state for the wearable device and this disclosure is not limited in this regard.

Figure 8:
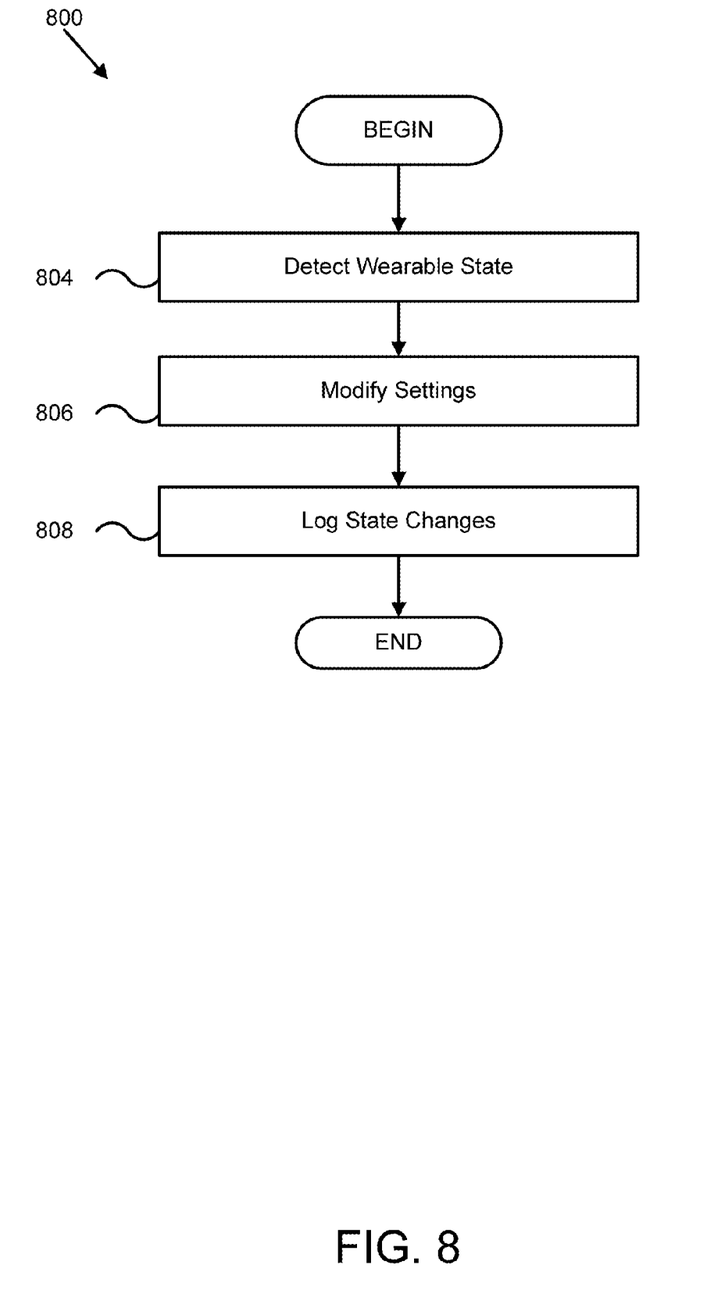
FIG. 8 is a schematic flow chart diagram illustrating one embodiment of a method for configuring wearable devices.

FIG. 8 is a schematic flow chart diagram illustrating one embodiment 800 of a method for configuring wearable devices. In one embodiment, the method 800 may begin and a wearing module 120 may detect 804 a current wearable state for a wearable device. The setting module 140 may modify 806 one or more configuration parameters for the wearable device responsive to the change. The wearing module 120 may log 808 the change and the method may end.

In one embodiment, logging the change may include the wearing module recording changes in a current wearable state. In another embodiment, logging the change may include notifying a remote server that the change occurred. In one example, a remote server may store changes in wearable states and the wearing module may transmit a message to the remote server each time a change occurs in the current wearable state for the wearable device. In another example, the wearing module 120 may record the changes locally, and periodically update the remote server with a history of changes. Of course, one skilled in the art may recognize other ways in which a wearing module may track, record, store, remember, or the like, changes in a wearable state for the wearable device and this disclosure is not limited in this regard.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a memory that stores code executable by the processor, the code comprising:
   code that detects a current wearable state for a wearable device, wherein the current wearable state is selected from the group consisting of on a person and off a person; and
   code that modifies a setting for the wearable device based on the detected wearable state, wherein the code modifies a setting selected from the group consisting of lowering power, requiring an authentication for subsequent inputs, communicating a recharge reminder, disabling wireless communications, and disabling alerts in response to the detecting the current wearable state is off the person, and wherein lowering power comprises reducing power of the wearable device while maintaining some power to the wearable device.

2. The apparatus of claim 1, where the code detects the current wearable state as on the person in response to a temperature exceeding a worn temperature threshold and detects the current wearable state as off the person in response to the temperature falling below a not worn temperature threshold, the temperature measured by a sensor selected from the group consisting of a thermometer and a camera.

3. The apparatus of claim 1, wherein the code detects the current wearable state as on the person in response to identifying an image of the person and detects the current wearable state as off the person in response to not identifying the image of the person, wherein the image is captured by a camera.

4. The apparatus of claim 1, wherein the code detects the current wearable state as on the person in response to detecting human motion and detects the current wearable state as off the person in response not detecting human motion.

5. The apparatus of claim 1, wherein the code detects the current wearable state as on the person in response to detecting a human audio signal and detects the current wearable state as off the person in response not detecting a human audio signal.

6. The apparatus of claim 1, wherein the code modifies a setting selected from the group consisting of powering off, disabling inputs, and disabling an output in response to the detecting the current wearable state is off the person.

7. The apparatus of claim 1, where the code modifies a setting selected from the group consisting of powering on, enabling inputs, enabling alerts, enabling wireless communications, and enabling an output in response to detecting the current wearable state is on the person.

8. The apparatus of claim 1, wherein the wearable device is selected from the group consisting of a hearing aid, a medical sensor, a watch, a ring, glasses, headphones, a necklace, and an anklet, the apparatus further comprising a log module that logs changes in a current wearable state for the wearable device.

9. A method comprising:
   detecting, by use of a processor, a current wearable state for a wearable device, wherein the current wearable state is selected from the group consisting of on a person and off a person; and
   modifying a setting for the wearable device based on the detected wearable state, wherein modifying the setting comprises modifying a setting selected from the group consisting of lowering power, requiring an authentication for subsequent inputs, communicating a recharge reminder, disabling wireless communications, and disabling alerts in response to the detecting the current wearable state is off the person, and wherein lowering power comprises reducing power of the wearable device while maintaining some power to the wearable device.

10. The method of claim 9, wherein the current wearable state comprises on the person in response to a temperature exceeding a worn temperature threshold and the current wearable state comprises off the person in response to the temperature falling below a not worn temperature threshold, the temperature measured by a sensor selected from the group consisting of a thermometer and a camera.

11. The method of claim 9, wherein the current wearable state comprises on the person in response to identifying an image of the person and the current wearable state comprises off the person in response to not identifying the image of the person, wherein the image is captured by a camera.

12. The method of claim 9, wherein the current wearable state comprises on the person in response to detecting human motion and the current wearable state comprises off the person in response not detecting human motion.

13. The method of claim 9, wherein the current wearable state comprises on the person in response to detecting a human audio signal and the current wearable state comprises off the person in response not detecting a human audio signal.

14. The method of claim 9, wherein the modifying comprises modifying a setting selected from the group consisting of powering off, disabling inputs, and disabling an output in response to the detecting the current wearable state is off the person.

15. The method of claim 9, wherein the modifying comprises modifying a setting selected from the group consisting of powering on, enabling inputs, enabling alerts, enabling wireless communications, and enabling an output in response to detecting the current wearable state is on the person.

16. The method of claim 9, wherein the wearable device is selected from the group consisting of a hearing aid, a medical sensor, a watch, a ring, glasses, headphones, a necklace, and an anklet, the method further comprising logging changes in a current wearable state for the wearable device.

17. The method of claim 9, further comprising logging changes in the current wearable state.

18. A program product comprising a non-transitory computer readable storage medium that stores code executable by a processor, the executable code comprising code to perform:
    detecting a current wearable state for a wearable device, wherein the current wearable state is selected from the group consisting of on a person and off a person; and
    modifying a setting for the wearable device based on the detected wearable state, wherein modifying the setting comprises modifying a setting selected from the group consisting of lowering power, requiring an authentication for subsequent inputs, communicating a recharge reminder, disabling wireless communications, and disabling alerts in response to the detecting the current wearable state is off the person, and wherein lowering power comprises reducing power of the wearable device while maintaining some power to the wearable device.

19. The computer program product of claim 18, wherein the current wearable state comprises on the person in response to a temperature exceeding a worn temperature threshold and the current wearable state comprises off the person in response to the temperature falling below a not worn temperature threshold, the temperature measured by a sensor selected from the group consisting of a thermometer and a camera.

20. The computer program product of claim 18, wherein the modifying comprises modifying a setting selected from the group consisting of powering off, disabling inputs, and disabling an output in response to the detecting the current wearable state is off the person.

* * * * *